US010315611B2

(12) United States Patent
Hill et al.

(10) Patent No.: US 10,315,611 B2
(45) Date of Patent: Jun. 11, 2019

(54) ONE-PIECE WOVEN VEHICLE OCCUPANT PROTECTION DEVICE (71) Applicant: TRW Vehicle Safety Systems Inc., Washington, MI (US)

(72) Inventors: Bruce R. Hill, Washington, MI (US); Philipp Ritter, Schwaebisch Gmuend (DE)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 38 days.

(21) Appl. No.: 15/325,099

(22) PCT Filed: Aug. 26, 2015

(86) PCT No.: PCT/US2015/046890
§ 371 (c)(1),
(2) Date: Jan. 10, 2017

(87) PCT Pub. No.: WO2016/033153
PCT Pub. Date: Mar. 3, 2016

(65) Prior Publication Data
US 2017/0182968 A1 Jun. 29, 2017

Related U.S. Application Data (60) Provisional application No. 62/041,718, filed on Aug. 26, 2014.

(51) Int. Cl.
B60R 21/235 (2006.01)
B60R 21/232 (2011.01)
D03D 1/02 (2006.01)
B60R 21/213 (2011.01)
D03D 47/32 (2006.01)
B60R 21/231 (2011.01)

(52) U.S. Cl.
CPC .......... B60R 21/235 (2013.01); B60R 21/213 (2013.01); B60R 21/232 (2013.01); D03D 1/02 (2013.01); D03D 47/32 (2013.01); B60R 21/23138 (2013.01); B60R 2021/23514 (2013.01); B60R 2021/23547 (2013.01); B60R 2021/23576 (2013.01)

(58) Field of Classification Search
CPC ... B60R 21/235; B60R 21/213; B60R 21/232; D03D 1/02; D03D 47/32
See application file for complete search history.

(56) References Cited

U.S. PATENT DOCUMENTS

5,421,378 A * 6/1995 Bowers ................. B60R 21/235
139/100
5,503,197 A 4/1996 Bower et al.
(Continued)

Primary Examiner — Shaun R Hurley
Assistant Examiner — Andrew Wayne Sutton
(74) Attorney, Agent, or Firm — Tarolli, Sundheim, Covell & Tummino LLP (57) ABSTRACT A method for manufacturing a one-piece woven air bag includes weaving yarns into a one-piece woven fabric air bag structure having single layer portions and two layer portions in which an inflatable volume is defined between the two layer portions and in which the single layer portions are non-inflatable portions that help define the shape and configuration of the inflatable volume. The step of weaving yarns is performed using a water-jet loom.

17 Claims, 6 Drawing Sheets (56) References Cited

U.S. PATENT DOCUMENTS

| | | | |
|---|---|---|---|
| 6,429,155 B1* | 8/2002 | Li | B32B 27/02 |
| | | | 280/728.1 |
| 7,409,970 B2* | 8/2008 | Sollars, Jr. | B60R 21/235 |
| | | | 139/389 |
| 2006/0128244 A1* | 6/2006 | Hill | B32B 5/024 |
| | | | 442/203 |
| 2013/0026740 A1* | 1/2013 | Finn | B32B 5/024 |
| | | | 280/728.1 |

* cited by examiner

ONE-PIECE WOVEN VEHICLE OCCUPANT PROTECTION DEVICE

RELATED APPLICATION

This application corresponds to PCT/US2015/046890, filed Aug. 26, 2015, which claims benefit of U.S. Provisional Appln. Ser. No. 62/041,718, filed Aug. 26, 2014, the subject matter of which is incorporated herein by reference in their entities.

TECHNICAL FIELD

The present invention relates generally to an apparatus for helping to protect an occupant of a vehicle. More particularly, the present invention relates to a one-piece woven (OPW), inflatable air bag woven on a water-jet loom.

BACKGROUND OF THE INVENTION

It is known to inflate an inflatable vehicle occupant protection device to help protect a vehicle occupant in the event of a vehicle collision. Examples of inflatable vehicle occupant protection devices include driver and passenger frontal air bags, side air bags, curtain air bags, inflatable seat belts, inflatable knee bolsters, and inflatable head liners.

Inflatable vehicle occupant protection devices can have a variety of constructions. For example, an inflatable vehicle occupant protection device can be constructed of overlying woven panels that are interconnected by means, such as stitching or ultrasonic welding, to form connections or seams that help define an inflatable volume of the protection device. As another example, an inflatable vehicle occupant protection device can have an OPW construction in which overlying panels are woven simultaneously. The panels are woven together to form connections or seams that help define an inflatable volume of the OPW protection device.

SUMMARY OF THE INVENTION

In accordance with one aspect of the invention a method for manufacturing a one-piece woven air bag includes weaving yarns into a one-piece woven fabric air bag structure having single layer portions and two layer portions in which an inflatable volume is defined between the two layer portions and in which the single layer portions are non-inflatable portions that help define the shape and configuration of the inflatable volume. The step of weaving yarns is performed using a water-jet loom.

In accordance with another aspect of the present invention method for manufacturing a one-piece woven air bag includes warping yarns on a beam of a water-jet loom and simultaneously weaving yarns into an air bag structure having two layer portions that define an inflatable volume and single layer portions forming seams delimiting the inflatable volume, with water from the water-jet loom lubricating the yarns during weaving. The air bag structure is coated and cut to define the one-piece woven air bag.

DETAILED DESCRIPTION

Figure 1:
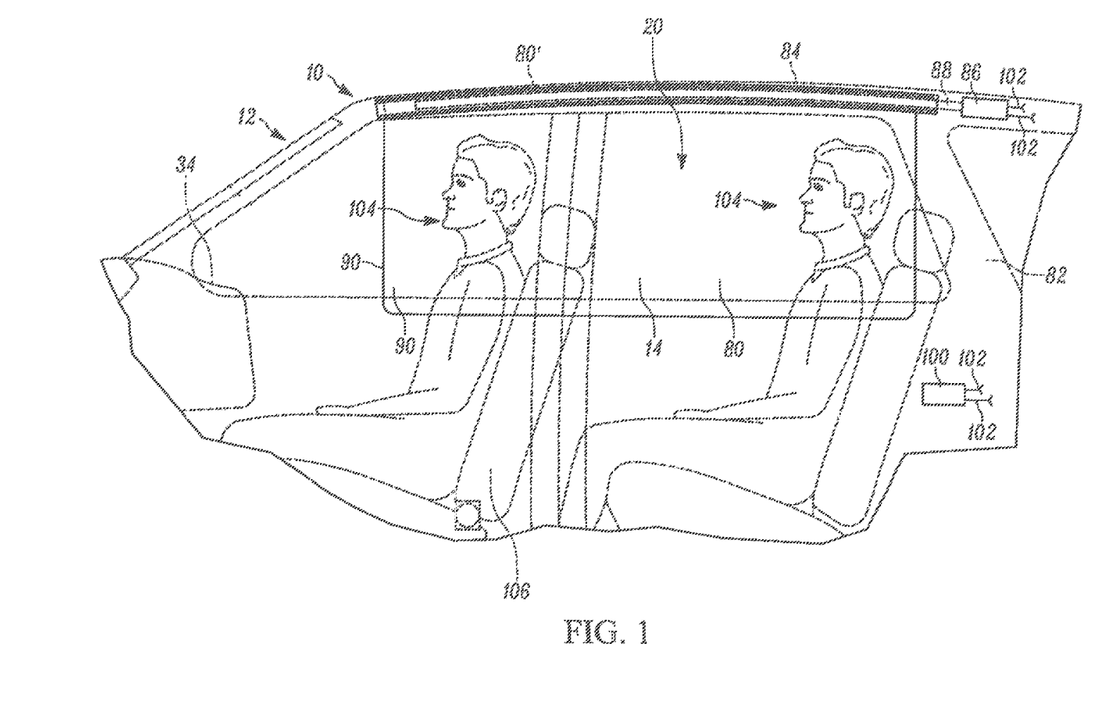
FIG. 1 is a schematic view of an apparatus for helping to protect an occupant of a vehicle according to the present invention.
Figure 2:
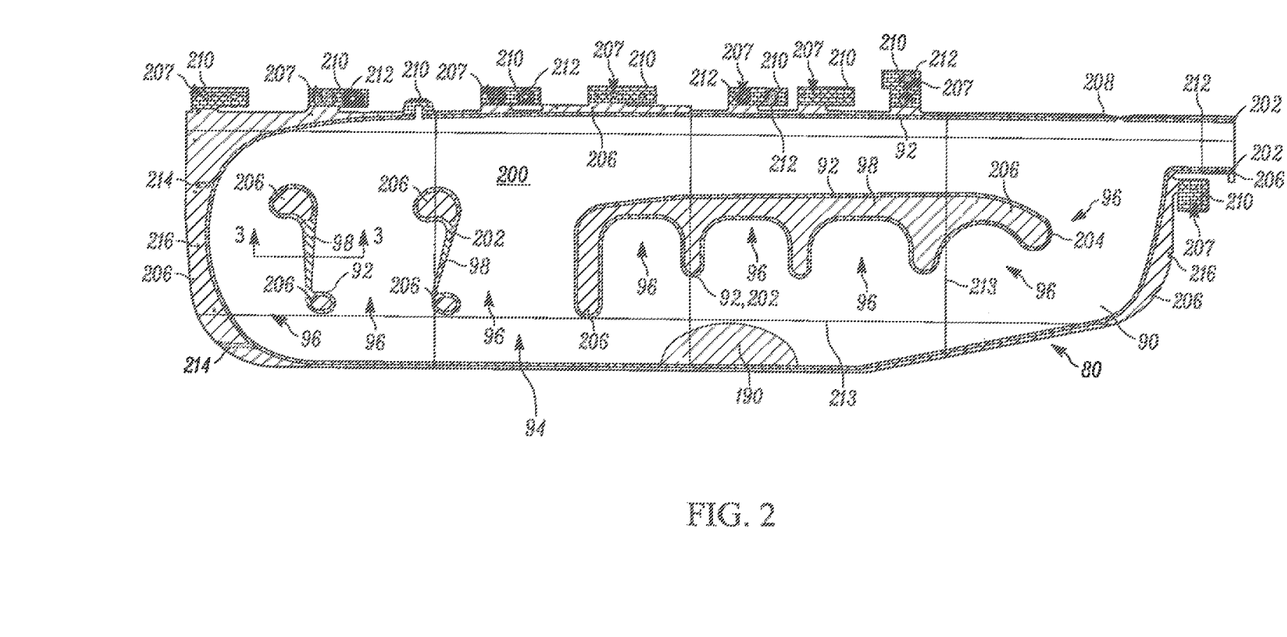
FIG. 2 is a side view of an curtain air bag of the apparatus of FIG. 1.

The present invention relates generally to an apparatus for helping to protect an occupant of a vehicle. More particularly, the present invention relates to an OPW, inflatable air bag formed using a water-jet loom. One example of such an apparatus 10 is illustrated in FIGS. 1-2 in which the apparatus is a curtain air bag or inflatable curtain for deployment between a side structure 82 of the vehicle and the vehicle occupant. In this configuration, the curtain air bag can cover at least two of the A, B, and C pillars of a vehicle 12. It will be understood, however, that the apparatus 10 of the present invention could also be configured for placement and deployment in any known location of the vehicle, e.g., steering wheel, door, front seat, etc. The apparatus 10 can therefore be used to protect the driver and/or any number of passengers in the vehicle. The OPW construction can be especially beneficial in a curtain air bag construction because this construction can afford long duration inflation and high pressurization capabilities, which can be desirable for this and other types of air bags.

The vehicle 12 can include one or more apparatuses 10 in the form inflatable vehicle occupant protection devices 14 that are inflatable to help protect one or more occupants 104 of the vehicle 12. Referring to FIG. 1, the inflatable vehicle occupant protection devices 14 can include an curtain air bag 80 on a passenger side 20 of the vehicle 12, and can include a similar or identical protection device (not shown) on a driver side of the vehicle. Other vehicle occupant protection devices (not shown) that can be constructed accordance with the invention can include, for example, side impact air bags, inflatable seat belts, inflatable knee bolsters, and inflatable head liners.

The curtain air bag 80 is mounted adjacent a side structured roof 84 of the vehicle. An inflator 86 is connected in fluid communication with the curtain air bag 80 through a fill tube 88. The inflator 86 can have a known construction suitable for inflating the curtain air bag 80. For example, the inflator 86 can contain a stored quantity of pressurized inflation fluid (not shown) in the form of a gas for inflating the curtain air bag 80. The inflator 86 alternatively could contain a combination of pressurized inflation fluid and ignitable material for heating the inflation fluid, or could be a pyrotechnic inflator that uses the combustion of gas-generating material to generate inflation fluid. As a further alternative, the inflator 86 could be of any suitable type or construction for supplying a medium for inflating the curtain air bag 80.

The fill tube 88 includes openings (not shown) through which inflation fluid is directed into the curtain air bag 80. The fill tube 88 can be constructed of any suitable material, such as plastic, metal or fabric. Alternatively, the fill tube 88 can be omitted, in which case the inflator 86 can be connected directly to the curtain air bag 80. The curtain air bag 80 is inflatable from a deflated and stored condition, illustrated in dashed lines at 80' in FIG. 1, to an inflated and deployed condition, illustrated solid lines at 80 in FIG. 1.

Referring to FIG. 2, the curtain air bag 80 includes integrally formed panels 90 that define an inflatable volume 94. Seams 92 extending along the panels 90 help define inflatable chambers 96 within the inflatable volume 94 and non-inflatable portions 98 of the curtain air bag 80. The curtain air bag 80 has an OPW construction in which the air bag is a single unitary woven article with portions, i.e., the panels 90, woven simultaneously as separate, single layers of material, and portions, i.e., the seams 92, woven as a single layer. The panels 90 and seams 92 together define the inflatable volume 94 and inflatable chambers 96.

The vehicle 12 includes one or more sensors (shown schematically at 100 in FIG. 1) for sensing the occurrence of an event for which inflation of the curtain air bag 80 is desired. Examples of such events include a vehicle impact (e.g., front, rear, side, offset, or angled impacts), a vehicle rollover, or both. Upon sensing the event, the sensor 100 provides electrical signal(s) over lead wires 102 to the inflator 86, which causes the inflator to be actuated in a known manner and discharge fluid under pressure into the inflatable volume 94 of the curtain air bag 80.

The curtain air bag 80 inflates under the pressure of the inflation fluid from the inflator 86 away from the roof 84 to a position between the side structure 82 of the vehicle 12 and any occupants 104 of the vehicle. The curtain air bag 80, when inflated, helps protect the vehicle occupant(s) 104 in the event of an impact to the vehicle 12, a vehicle rollover, or both. The curtain air bag 80, when inflated, also helps absorb the energy of impacts with the curtain air bag and helps distribute the impact energy over a large area of the curtain air bag.

The curtain air bag 80 has a construction that promotes seam integrity, easier and more compact packaging, and uniform shrinkage in the weft direction. To accomplish this, in the OPW construction of the curtain air bag 80, the panels 90 are woven with various different weave patterns. The curtain air bag 80 has a length measured in a warp direction (left to right as viewed in FIG. 2) of the curtain air bag and a width measured perpendicular to the length and in a weft direction (top to bottom as viewed in FIG. 2) of the curtain air bag.

Figure 3:
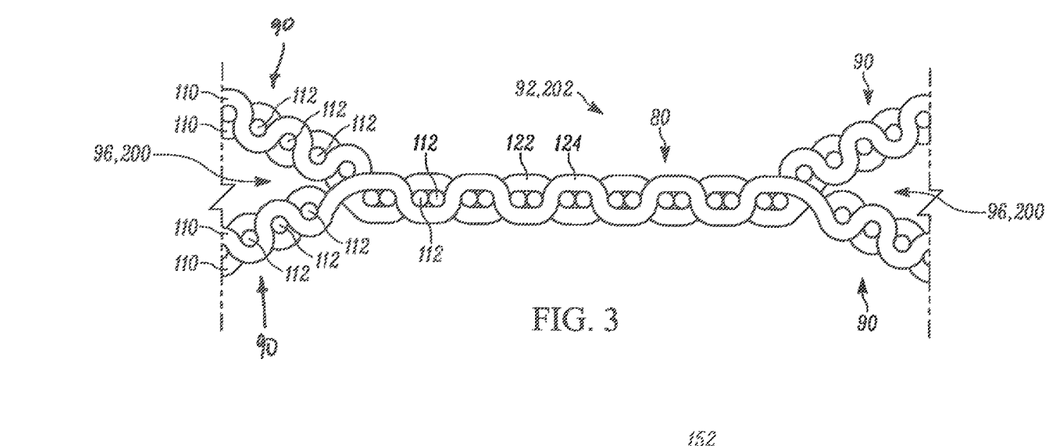
FIG. 3 is a sectional view illustrating the weave of a portion of the curtain air bag of FIG. 2 taken generally along line 3-3.

Referring to FIG. 3, the panels 90 each includes a plurality of warp yarns, or "ends", indicated at 110. The panels 90 also each includes a plurality of weft yarns, or "picks," indicated at 112. The warp yarns 110 and the weft yarns 112 are oriented perpendicular to each other. The warp yarns 110 are interlaced with the weft yarns 112 in an alternating or "up and down" fashion. In areas of the curtain air bag 80 other than the seams 92, each panel 90 is woven in a one-by-one (1×1) weave pattern referred to in the art as a "plain weave" pattern. In this plain weave pattern, single warp yarns 110 are interlaced around single weft yarns 112, as shown in FIG. 3. Since the curtain air bag 80 has an OPW construction, the plain weave is referred to in the art as a double layer plain weave.

According to the present invention, the seams 92 have constructions that vary from the plain weave pattern in order to provide a desired function for the particular seam. In the portion illustrated in FIG. 3, the seam 92 has a non-plain, one-by-two (1×2) weave pattern, hereafter referred to as a low float weave pattern. Low float weave patterns are shown and described in U.S. Patent Publication No. 2006/0284403, the entirety of which is incorporated herein by reference.

In this 1×2 weave pattern, the warp yarn 110 identified at 122 is a first warp yarn and the warp yarn identified at 124 is a second warp yarn. The yarns 122 and 124 are interlaced alternately over and under groups of two weft yarns 112. Each warp yarn 110 is interlaced on opposite sides of each weft yarn 112. It will be appreciated, however, that the seam 92 could have an alternative non-plain weave pattern, examples of which are noted below.

The plain woven and non plain woven portions of the panels 90 can have different permeabilities. For example, the non-plain woven portions can have a higher permeability than the plain woven portions due to the looser weave and higher propensity for yarn shifting in the non-plain weave. According to the present invention, a coating 190 (FIG. 2) can be applied to the panels 90 to help control the gas permeability of the panels and maintain the gas permeability of the panels at a desired level. The curtain air bag 80 can thus maintain the improved seam integrity and packaging provided, by the plain and non-plain woven portions described above without sacrificing permeability.

The coating 190 can be any coating suited to provide desired permeability characteristics. For example, the coating 190 can comprise a gas impermeable or substantially gas impermeable urethane or silicone material. One such material is a polycarbonate polyurethane coating. Another such material is a thermoplastic adhesive film such as Nolax® 45.6000 C. To help prevent blocking, a polyether or polyester based urethane coating can be applied as an additional coating or can be mixed with the coating 190. A liquid based flame retardant, e.g., Fyroflex RDP or Lindol CDP, can also be added to the coating. The total weight of the coating applied to the curtain air bag 180 can be about 27 grams per square meter (g/m$^2$) or less.

FIG. 2 illustrates the curtain air bag 80 with both plain woven portions and non-plain woven portions. Portions 200 of the curtain air bag 80 (indicated without cross-hatching) identify portions of the woven panels 90 woven in separate layers with the double layer plain weave. Portions 202 (cross-hatched) of the curtain air bag 80 identify portions of the woven panels 90 woven together with the 1×2 low float weave pattern to help form the seams 92 of the curtain air bag 80. Portions 204 (cross-hatched) of the curtain air bag 80 identify portions of the woven panels 90 woven together with a gegenschlauch ("counter tube") seam to help form additional seams 92 of the curtain air bag 80. The portions 202, 204 forming the seams 92 can have an alternative weave pattern, such as a 3×3 panama or basket weave pattern, alternative basket weave pattern or weave repeat pattern.

A portion 206 (cross-hatched) extends around the entire periphery 208 of the curtain air bag 80 and identifies portions of the panels 90 woven together with a BST 99 weave pattern. Portions 210 (cross-hatched) of the curtain air bag 80 are provided along the top of the periphery 208 and at the rear end of the curtain air bag. Each portion 210 includes one or more openings 207 that receive fasteners (not shown) to help secure the curtain air bag 80 to the vehicle 12 adjacent the roof 84. The portions 210 identify portions of the panel 90 woven together with a rip stop weave pattern. Portions 212 (cross-hatched) of the curtain air bag 80 are provided within the perimeter of some portions 210 and identify portions of the panel 90 woven together with a BST 24 weave pattern. The portions 212 extend around the openings 207 in the portions 210.

Portions 214 (cross-hatched) of the curtain air bag 80 are provided at the front end of the curtain air bag and identify portions of the panels 90 woven together with a 3×3 panama/basket weave pattern. Portions 316 of the curtain air bag 80 are provided at the front and rear ends of the curtain air bag and identify portions of the panels 90 woven together with a measure marker weave pattern. It will be understood that any of the non-plain weave portions 206, 210, 212, 214, 216 can exhibit alternative non-plain weave patterns or a plain weave pattern known in the art.

Weave patterns include what are referred to in the art as "floats." A "float" refers to the number of adjacent warp yarns 110 or a weft yarns 112 that a weft yarn or warp yarn, respectively, extends over or under. The number of floats in a woven fabric varies with the particular type of weave with which the fabric is woven. For example, a plain woven fabric includes single floats because the warp and weft yarns pass over and under single weft and warp yarns, respectively. As another example, a 1×2 woven fabric includes two floats because the warp yarns and weft yarns pass over and under two adjacent weft and warp yarns, respectively.

In areas of a fabric where different weave patterns interface with each other floats in addition to those normally occurring in the weave patterns may occur. This is especially relevant in an OPW air bag design where a double layer plain weave interfaces with a non-plain weave pattern, e.g., at the transitions between the inflatable chambers 96 and the seam 92. The number and location of these excess floats is determined by the weave pattern of the fabric at the interface. While the existence of excess floats at the interface may be unavoidable, the weave pattern may be configured, to a large extent, to help place a desired number of floats in a desired location at the interface between the weave patterns.

Figure 4:
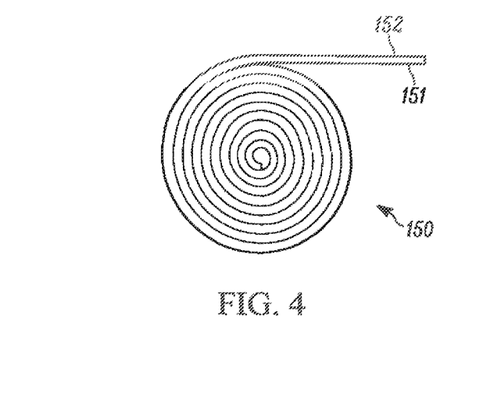
FIG. 4 is a side view of a roll of fabric material for forming the curtain air bag of FIG. 2.
Figure 5:
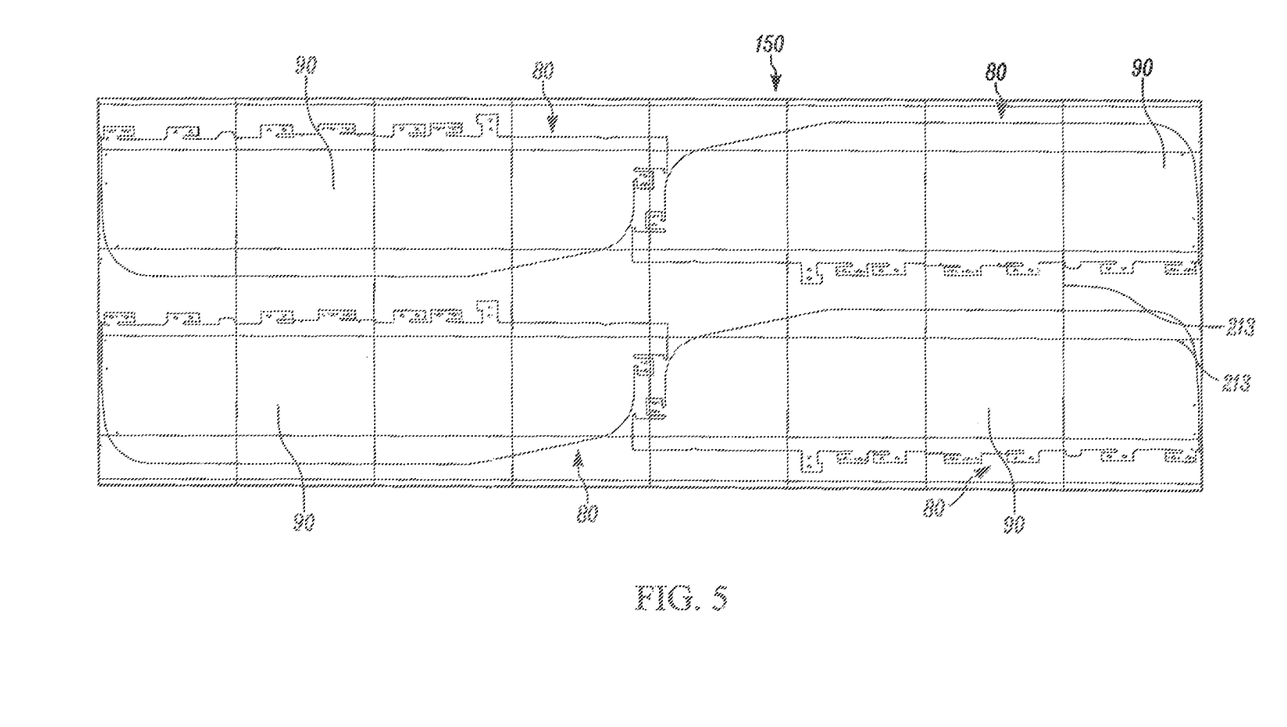
FIG. 5 illustrates the roll of FIG. 4 in an unfurled state.

The panels 90 used to construct the curtain air bag 80 are formed in a continuous roll of fabric material 150, shown in FIG. 4. The weave patterns used to weave the panels 90 are selected to promote processing the woven roll 150 of material. Once the roll 150 is produced and any coating(s) 190 applied, the panels 90 are cut out from the roll to define the curtain air bag 80. This cutting can be performed by cutting machines (not shown) that use vision systems to help improve cutting accuracy. The vision systems search for markers on the fabric of the roll 150 that allow the system to determine whether cuts are being made at the proper locations. Typically, these markers comprise intersecting marker yarns 213 woven into the fabric of the panels 90, as shown in FIG. 5 with the roll 150 in an unfurled state. The marker yarns 213 have a color that is different from the rest of the fabric on the roll 150 and thus stand out visually. The marker yarns 213 are visible on a first side 152 of the roll 150, with a second, opposite side 151 of the roll being white.

To weave the intersecting marker yarns 213, a beam of warp yarn having the marker color is installed at one or more warp positions on the loom. To form the marker yarn intersections, yarns are inserted at the appropriate well locations along the length of the roll 150 and inserted at the appropriate warp locations. As a result, a grid of warp and weft marker yarns 213 is formed on the roll 250. The marker yarns 213 can be, for example, 470 dtex black marker yarns capable of being recognized by the vision system.

Figure 6:
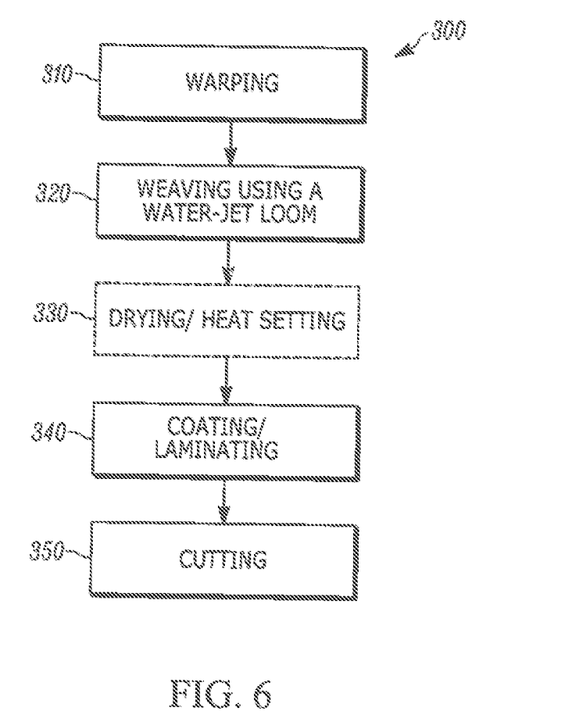
FIG. 6 is a flow chart illustrating a method of forming the apparatus of FIG. 1.

In accordance with the present invention, a method 300 of forming the curtain air bag 80 is illustrated in FIG. 6. At step 310, the yarns are warped before being woven on a water-jet loom at step 320 to form the roll 150 shown in FIG. 4 having an OPW construction. At step 330, the OPW roll 150 is dried and/or heat set. At step 340, the roll 150 is coated and/or laminated. At step 350, the roll 150 is cut to the pattern shown in FIG. 6 to define the curtain air bag 80. It will be appreciated that the step 330 can be omitted depending on the specifies of the remaining steps 310, 320, 340, 350.

According to the invention, the OPW curtain air bag 80 is advantageously formed using a water-jet loom. Currently, OPW air bags can be manufactured only on a rapier or Jacquard loom. Current manufacturing methods for OPW air bags is a multi-step process that is both time consuming and costly. The current process involves first placing the yarns on the beam (also known as warping). A finish is applied to the yarns to protect them during weaving (also known as sizing). The yarns are then simultaneously woven as separate, overlying layers of material at some locations, and as a single layer of material at other (seam) locations to produce the OPW roll of fabric.

During the weaving process, the warp yarns abrade against the weft yarns while passing over and under one another. The finishing applied at the sizing step acts as a protective barrier between the yarns that protects them from damage. Once the weaving is completed, the OPW fabric roll is washed to remove the sizing finish from the yarns (also known as scouring). The washed OPW fabric is then dried and/or heat set. A coating and/or lamination is applied to the dried roll to improve permeability, flame retardation, etc. The coated roll is then cut using the marker yarns to separate the individual OPW air bags from the roll.

Using a water-jet loom in accordance with the present invention to form the OPW curtain eliminates several of the aforementioned steps. In particular, using a water-jet loom eliminates sizing and scouring of the yarns. This is possible because the water used to weave the weft and warp yarns acts as a lubricant that protects the yarns during weaving and eliminates the need to apply an additional finish layer to the yarns. Consequently, the woven yarns do not need washing to remove the finish.

The present invention therefore takes advantage of the realization that the water used to propel the warp yarns can act as a lubricant that helps prevent damage to the yarns due to abrasion, which would normally occur if the OPW air bag was woven without first sizing the yarns. In other words, die water used to weave the OPW air bag can be used in lieu of the finishing lubricant.

This is neither trivial nor obvious because conventional wisdom prior to the invention was that sizing was required to prevent yarn damage. Thus, one having ordinary skill in the art would believe that forming an OPW air bag using a water-jet loom would require yarn sizing to prevent damaging the yarns during weaving. Sizing yarns prior to weaving them on a water-jet loom, however, does not make sense because water from the water jet utilized by the loom would wash off or otherwise compromise the sizing. Sizing yarns and weaving yarns using a water-jet loom therefore work against one another. Consequently, conventional wisdom for an OPW air bag, knowing that extremely tight weave densities are required, was that water-jet weaving was conventionally held to be not an option. This is evidenced by the fact that prior to the invention, water-jet looms were not even capable of producing an OPW air bag. That being said, successfully using a water-jet loom to form the OPW curtain air bag 80 of the present invention without sizing the yarns is both unexpected and contrary to the conventional wisdom of forming OPW air bags.

It is worth noting that using the water-jet loom can eliminate the drying and heat setting step, depending on the condition of the yarns once the weaving is completed. It is clear from the above that using a water-jet loom to manufacture the OPW curtain air bag 80 eliminates multiple processing steps previously required with rapier and air jet looms. It is also worth noting that, weaving speeds using a water-jet loom are about 20% faster than conventional rapier weaving technology. As a result, the water-jet woven OPW curtain air bag 80 of the present invention can be produced quicker (faster weave time and eliminated manufacturing steps) and therefore cheaper than conventional OPW air bags.

In particular, when forming the overlying, sewn-together panels using a water-jet loom, the yarns are manipulated into relatively simple weaving patterns capable of being performed by current water-jet looms. OPW weaving patterns, however, are significantly more complicated and involve weaving patterns too complex to be performed by current water-jet looms. Consequently, the water-jet loom used to make the curtain air bag 80 of the present invention was modified to accommodate a Jacquard head and harness.

470 dtex/96 PET from Hailide®. The woven air bag was laminated on a flat bed machine with a Nolax® 45.6000 film. Three air bags were then heat aged (ETR 13-03-6163) for 408 hours at 105° C. Bag dimensions were checked before and after. One of the heat aged curtains was laminated a second time on a hot press and pressurized at 85° C. until film blistering was observed. After the second lamination, the film blistered at 100 kPa. The air bags were then statically deployed (ETR 13-03-6173) at 23° C., 85° C., and −35° C. (1 at each temperature). The dimensions of the air bag during phases of the manufacturing process are illustrated in the following table:

| Loop #1 | Nominal (mm) | Loom-state | | | | After lamination (BGF) | | | | After 105° C., 408 hrs | | | |
|---|---|---|---|---|---|---|---|---|---|---|---|---|---|
| | | 1 | 2 | 3 | 4 | 1 | 2 | 3 | 4 | 1 | 2 | 3 | 4 |
| Height | 445 | 451 | 451 | 452 | 451 | 445 | 445 | 447 | | 445 | 445 | 445 | |
| Length | 1715 | 1938 | 1936 | 1935 | 1938 | 1905 | 1895 | 1910 | | 1895 | 1885 | 1898 | |

Moreover, the Jacquard harness—which normally does not operate in/around water—was itself modified to prevent corrosion during operation of the water-jet loom. In other words, a special, corrosion-resistant harness was developed to produce the curtain air bag 80 of the present invention.

Furthermore, OPW curtain air bags have higher weave densities than curtains formed from overlying, sewn-together panels. This is true in part because OPW air bags typically have higher inflation pressure requirements than air bags formed from sewn-together panels, and also because the yarns that weave both of the separate plain woven panels 90 are combined in the single layer seams 92. Consequently, the water-jet loom used to form the curtain air bag 80 of the present invention had to be made more robust in order to handle the forces present in this higher density weaving. This included reinforcing and further reconfiguring the jacquard head and harness.

Additionally, the water-jet loom used to form the curtain air bag 80 of the present invention had to be modified to accommodate the marker yarns 213. More specifically, water-jet looms typically include a single nozzle for the warp yarn, with the same warp yarn being used for the entire air bag. In the present invention, one type of yarn is used for the majority of the warp yarns 170, with a different yarn used intermittently for the marker yarns 213 in the warp direction. The single yarn nozzle of conventional water-jet looms, however, is incapable of handling multiple yarn types. Consequently, in the present invention a second, specially designed nozzle for handling only the marker yarn was constructed and implemented into the already modified water-jet loom. This allowed the modified water-jet loom to readily form the curtain air bag 80 of the present invention having the marker yarns 213 facilitating cutting. From the above, it is clear that extensive modifications were made to a typical water-jet loom in order to manufacture OPW curtain air bags 80 with marker yarns 213 for cutting in accordance with the present invention.

Example OPW Curtain Air Bag Construction

Figure 7:
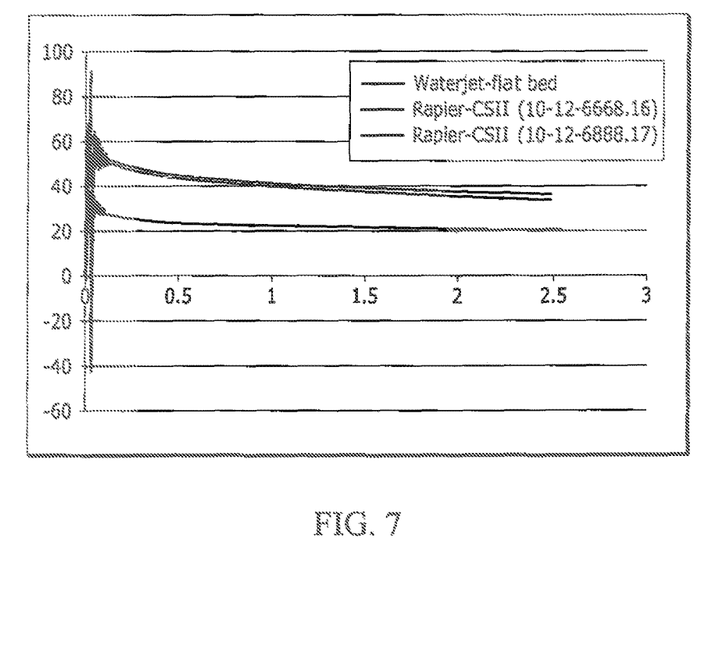
FIG. 7 is a graph comparing interior gas pressure between OPW air bags formed on different looms.

AN OPW inflatable air bag was formed using a water-jet loom having a reed spacing of 280 cm. The yarn used was Results Referring to FIG. 7, the OPW air bag was compared to a pair of air bags formed on conventional rapier looms. The longer bag 23° C. temperature resulted in a lower peak air bag pressure.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations.

Having described the invention, the following is claimed:

1. A method for manufacturing a one-piece woven air bag, comprising:
   weaving yarns into a one-piece woven fabric air bag structure having single layer portions and two layer portions in which an inflatable volume is defined between the two layer portions and in which the single layer portions are non-inflatable portions that help define the shape and configuration of the inflatable volume, wherein the step of weaving yarns is performed using a water-jet loom having a Jacquard head and harness and includes weaving warp yarns with a first nozzle and weaving a marker yarn with a second nozzle.

2. The method of claim 1, wherein the air bag structure is a side curtain.

3. The method of claim 1, further comprising the step of lubricating the yarns with the water from the water jet utilized by the loom.

4. The method of claim 1, wherein water used to weave the yarns acts as a lubricant to prevent abrasion between the yarns during weaving.

5. The method of claim 1, wherein the two layer portions are woven in a plain weave pattern and the single layer portions are woven in a non-plain weave pattern.

6. The method of claim 5, wherein the plain weave pattern is a double plain weave pattern.

7. The method of claim 5, wherein the non-plain weave pattern is a basket weave.

8. The method of claim 5, wherein the non-plain weave pattern is a low float seam.

9. A method for manufacturing a one-piece woven air bag, comprising:
  warping yarns on a beam of a water-jet loom having a Jacquard head and harness;
  simultaneously weaving yarns into a fabric air bag structure having two layer portions defining an inflatable volume and single layer portions forming seams delimiting the inflatable volume, wherein the warp yarns are woven with a first nozzle and a marker yarn is woven with a second nozzle, wherein water from the water-jet loom lubricates the yarns during weaving;
  coating the air bag structure; and
  cutting the coated air bag structure to define the one-piece woven air bag.

10. The method of claim 9, wherein the air bag structure forms a side curtain.

11. The method of claim 9, wherein water used to weave the yarns acts as a lubricant to prevent abrasion between the yarns during weaving.

12. The method of claim 9, wherein the two layer portions are woven in a plain weave pattern and the single layer portions are woven in a non-plain weave pattern.

13. The method of claim 12, wherein the plain weave pattern is a double plain weave pattern.

14. The method of claim 12, wherein the non-plain weave pattern is a basket weave.

15. The method of claim 12, wherein the non-plain weave pattern is a low float seam.

16. The method of claim 9, wherein the Jacquard head and the harness are corrosion-resistant.

17. The method of claim 1, wherein the Jacquard head and the harness are corrosion-resistant.

* * * * *